Patented Jan. 29, 1929.

1,700,491

UNITED STATES PATENT OFFICE.

JAMES H. GRAVELL, OF ELKINS PARK, PENNSYLVANIA.

MATERIAL AND PROCESS FOR REMOVING PAINT AND VARNISH.

No Drawing.　　Application filed April 15, 1926.　Serial No. 102,310.

This invention relates to the removal of paint and varnish and although the invention applies broadly to that art it is especially directed to the removal of high bake enamels, such as are used on automobile fenders.

Objects of the invention are to provide a material capable of removing high bake enamels; a material that can be handled without undue risk, a material which will not injure the work and from which can be salvaged useful materials. It is also an object of the invention to provide a process for removing paint coatings, including high bake enamels, and which is well adapted for large production work where the material is handled in baskets and carried from one step to another until it is in condition to repaint. It is also an object of the invention to provide an improved process which is quicker and more efficient than any now known to me in the present state of the art.

The invention is based on the observation that concentrated sulphuric acid acts as a solvent for many organic substances, and also on the observation that if that acid is diluted so that it becomes ionized or decomposed into ions, it ceases to have the desirable solvent action.

Concentrated sulphuric acid, although capable of dissolving paint coatings, is unsatisfactory from any standpoints, namely, the great personal risk, its decomposition at the high temperature required for it to accomplish its purpose, and the fumes arising from the bath cause untold destruction of property and discomfort to operators.

I have found, however, that, if sulphuric acid is diluted without causing it to ionize or decompose into ions, its useful solvent characteristics are retained, and its undesirable characteristics are minimized or suppressed, and thus such a composition may be used for removing paint, varnish and enamel. In this diluted and un-ionized condition, without decomposition or with comparatively little decomposition into ions, the acid is much less physiologically harmful and therefore can be handled with greater ease; the temperature at which it evaporates may be considerably lower and the work produced is of a higher quality.

Although a number of substances may be used for diluting sulphuric acid without substantial or objectionable ionization, such as alcohols, aldehydes, ketones, quinones, ethers, acetals, esters, lactones, anhydrides, unsaturated hydrocarbons, phenols, cresols, xylenols, and the like, I have found cresylic acid very satisfactory, and to make one suitable admixture I use;

*Formula No. 1.*

|  | Gallons. |
|---|---|
| Cresylic acid | 55 |
| Sulphuric acid | 10 |

When this admixture is heated to 252° F. it will quickly dissolve without carbonization such coatings as are commonly used on automobile fenders in less than 15 minutes. The material is rather viscous and if desired may be thinned with butyl alcohol according to the following proportions:

*Formula No. 2.*

|  | Gallons. |
|---|---|
| Cresylic acid | 55 |
| Sulphuric acid | 10 |
| Butyl alcohol | 10 |

The material or admixture described above although operating satisfactorily at the temperature indicated has practically no effect on bitumen coatings in the cold, so in order to reduce the operating temperature of my material I add a chlorinated hydrocarbon such as tetrachlorethane. The tetrachlorethane not only acts to reduce the operating temperature of the admixture but has a tendency to raise its boiling point and in addition materially reduces the flash point. The amount of tetrachlorethane may be as shown in the following:

*Formula No. 3.*

|  | Gallons. |
|---|---|
| Cresylic acid | 55 |
| Sulphuric acid | 10 |
| Butyl alcohol | 10 |
| Tetrachlorethane | 25 |

The butyl alcohol mentioned in these formulas not only acts as a thinner but also materially assists in preventing the tetrachlorethane from separating out of the admixture when standing.

To carry out my process I select any of the above formulas, but preferably No. 3. I heat this admixture to substantially 250° F. I then immerse the work to be stripped of its paint coating in this bath until the result is accomplished. If the work is allowed to drain and dry in this condition a thin film of the remover or admixture is left behind which would seriously interfere with properly repainting the job. So in order to prepare the stripped work for repainting I remove my admixture. This may be accomplished by washing in water, or first treating with a solvent such as a caustic alkali solution, or alcohol, or both, and then washing with water. This has been found to be entirely satisfactory in most cases but in order further or more certainly to make the surface adapted for painting an additional dip into dilute phosphoric acid has been found to be very beneficial.

It is evident from the above that my process essentially consists in first removing the paint coatings with a diluted but un-ionized solution of sulphuric acid, and then removing the solution along with the products of its reaction, and in some cases further extending the process by treating it with dilute phosphoric acid.

My process accomplishes in a few minutes, for example, twenty minutes, that which takes hours to perform with caustic soda, and similar baths which are now used for the purpose and in addition the work strips clean and requires no hand work, the paint coating is entirely removed from even deep seams and corners.

It will be obvious to those skilled in the art to which the invention relates that modifications may be made in details of procedure, and in the matter of proportions, and that the rule of equivalents applicable to chemical inventions is appropriate, hence I do not limit the invention in respect to such matters or otherwise than as the prior art and the appended claims may require.

I claim:

1. A paint and varnish remover consisting of an admixture of free and un-ionized sulphuric acid and cresylic acid.

2. A paint and varnish remover consisting of an admixture of free and un-ionized sulphuric acid, cresylic acid, and butyl alcohol.

3. A paint and varnish remover consisting of an admixture of free and un-ionized sulphuric acid, cresylic acid, butyl alcohol and tetrachlorethane.

4. The method of removing paint coatings from metal consisting in subjecting the same to the action of diluted and un-ionized sulphuric acid at a temperature of substantially 250° F., and removing the sulphuric acid along with the products of its reaction.

5. The method of removing paint coatings from metal to be repainted consisting in dissolving the coating with an un-ionized solution of sulphuric acid, washing the work to remove the sulphuric acid, treating the metal with dilute phosphoric acid, and then washing the metal to produce a clean surface properly prepared to receive the paint coating.

JAMES H. GRAVELL.